United States Patent [19]

Takahashi

[11] Patent Number: 4,800,478
[45] Date of Patent: Jan. 24, 1989

[54] METHOD AND APPARATUS FOR CONTROLLING PWM INVERTER

[75] Inventor: Isao Takahashi, Nagaoka, Japan

[73] Assignee: Kabushiki Kaisha Toshiba, Kawasaki, Japan

[21] Appl. No.: 932,739

[22] PCT Filed: Sep. 3, 1985

[86] PCT No.: PCT/JP85/00492
§ 371 Date: Oct. 31, 1986
§ 102(e) Date: Oct. 31, 1986

[30] Foreign Application Priority Data
Mar. 1, 1985 [JP] Japan .................................. 60-41467

[51] Int. Cl.$^4$ ...................... H02M 7/527; H02P 7/63
[52] U.S. Cl. .......................................... 363/41; 363/98; 363/132; 318/800; 318/812
[58] Field of Search ...................... 363/35, 37, 41, 98, 363/131, 132; 318/432, 433, 800, 802, 808, 809, 812

[56] References Cited

U.S. PATENT DOCUMENTS

| | | | |
|---|---|---|---|
| 4,276,505 | 6/1981 | Bose | 318/809 X |
| 4,310,791 | 1/1982 | Akamatsu | 318/808 X |
| 4,456,868 | 6/1984 | Yamamura et al. | 318/802 X |
| 4,499,413 | 2/1985 | Izosimov et al. | 318/802 |

FOREIGN PATENT DOCUMENTS

61-106090  5/1986  Japan .

*Primary Examiner*—Patrick R. Salce
*Assistant Examiner*—Emanuel.Todd Voeltz
*Attorney, Agent, or Firm*—Foley & Lardner, Schwartz, Jeffery, Schwaab, Mack, Blumenthal & Evans

[57] ABSTRACT

In the control of a PWM inverter, there are various requirements such as decreasing a harmonic loss and acoustic noises, improving control response, optimizing switchings of the branches of the inverter in any condition, and simplification in circuit construction. In the present invention, the branches of the inverter are controlled in such that an evaluation function on the whole combination of the inverter and the load connected to the AC side of the inverter is made to be minimized.

6 Claims, 5 Drawing Sheets

| φ·τ | θ | I | II | III | IV | V | VI |
|---|---|---|---|---|---|---|---|
| φ=0 | τ=1 | V̇(1,1,0) | V̇(0,1,0) | V̇(0,1,1) | V̇(0,0,1) | V̇(1,0,1) | V̇(1,0,0) |
| | τ=0 | V̇(1,1,1) | V̇(0,0,0) | V̇(1,1,1) | V̇(0,0,0) | V̇(1,1,1) | V̇(0,0,0) |
| | τ=-1 | V̇(1,0,1) | V̇(1,0,0) | V̇(1,1,0) | V̇(0,1,0) | V̇(0,1,1) | V̇(0,0,1) |
| φ=1 | τ=1 | V̇(0,1,0) | V̇(0,1,1) | V̇(0,0,1) | V̇(1,0,1) | V̇(1,0,0) | V̇(1,1,0) |
| | τ=0 | V̇(0,0,0) | V̇(1,1,1) | V̇(0,0,0) | V̇(1,1,1) | V̇(0,0,0) | V̇(1,1,1) |
| | τ=-1 | V̇(0,0,1) | V̇(1,0,1) | V̇(1,0,0) | V̇(1,1,0) | V̇(0,1,0) | V̇(0,1,1) |

METHOD AND APPARATUS FOR CONTROLLING PWM INVERTER

TECHNICAL FIELD

This invention relates to a method and apparatus for controlling a pulse width modulation (PWM) inverter.

This invention is utilized in a case where an AC servo motor is required to operate with a low harmonic loss, low acoustic noise, fast torque response and high efficiency, or in a case where, in the current controlling system using a PWM inverter, the control error is required to be minimum under the limited switching frequencies.

BACKGROUND ART

According to one of the conventional methods, in the current control, a deviation of output current from a calculated current command value (or vector value) is inputted to a comparator, and then an output of the comparator indicating a comparison result is used to determine the switching pattern of the PWM inverter, i.e. on/off of the branches of the inverter.

In other words, in the conventional method, there is only one state variable or state vector to determine the switching.

However, according to the method, the optimum switching is not always accomplished because the switching method is determined by only one state variable.

For example, some high frequency currents and acoustic noises have been observed. Moreover, there exists another problem in which the structure of the circuits for obtaining a command value are complicated because the one command value is used to control the whole system.

It is the object of the present invention to solve the above-mentioned problems.

DISCLOSURE OF INVENTION

The present invention is characterized in that each arm of an inverter is adequately switched in such manner that an evaluation function on a state between the inverter and the system connected to the AC side of the inverter is minimized.

BEST MODE FOR CARRYING OUT THE INVENTION

Figure 1:
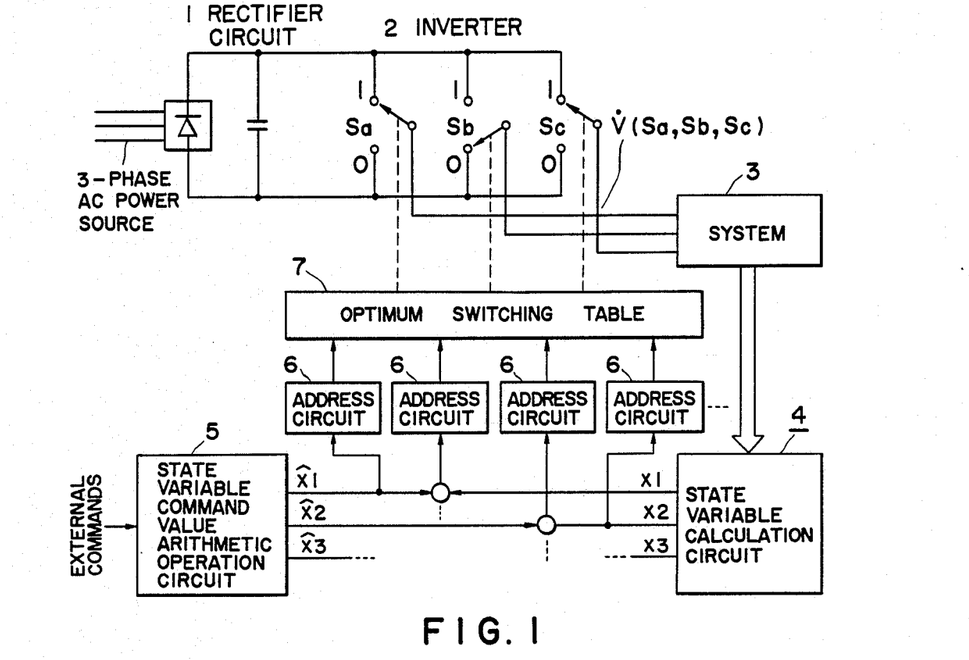
FIG. 1 is a block diagram showing a system to execute control according to the present invention.

In FIG. 1 showing a preferred embodiment of the invention, reference numeral 1 denotes a rectifier circuit, 2 a PWM inverter (a voltage type inverter is shown but a current type inverter may also be used), 3 a load connected to the inverter (e.g. an AC motor or a power supply), 4 a detection and arithmetic circuit for state variables $\hat{x}1, \hat{x}2, \ldots$, 5 denotes an arithmetic operation circuit which calculates optimum command values $x1, x2, x3, \ldots$ which correspond to $\hat{x}1, \hat{x}2, \hat{x}3, \ldots$ according to external commands. 6 denotes an address circuit which has, for analogue input signals, a conversion circuit which converts an analogue input signal to the digital form and includes a comparator or an A/D converter, or which has, for digital input signals, a conversion circuit for converting the inputted digital signals into a suitable form when they are inputted into an optimum switching table to be described later. The optimum switching table 7 is programmed in such manner that the PWM inverter minimizes the error of a state variable $\hat{x}i - xi$ using the designated evaluation function.

Now, assuming that the inverter is composed of three branches respectively including switching elements $S_a$, $S_b$, $S_c$, and that the instantaneous voltage vector $v(S_a, S_b, S_c)$ can take the following 8 vector values according to the state 1 or 0 (1 denotes the upper position and 0 denotes the lower position) of the switching elements: $\dot{v}(0,0,0)$, $\dot{v}(1,0,0)$, $\dot{v}(0,1,0)$, $\dot{v}(1,1,0)$, $\dot{v}(0,0,1)$, $\dot{v}(1,0,1)$, $\dot{v}(0,1,1)$, $\dot{v}(1,1,1)$.

In these vectors, $\dot{v}(0,0,0)$ and $\dot{v}(1,1,1)$ are zero vectors because the output voltages are zero.

Figure 2:
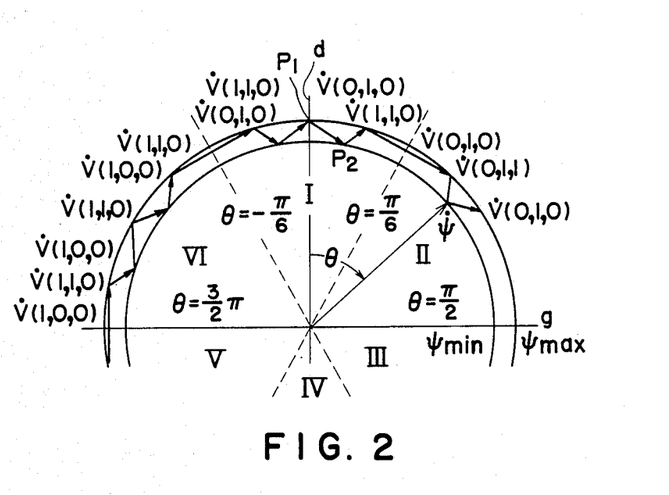
FIG. 2 is a vector diagram showing the relation between a locus of an optimum primary flux linkage vector and a locus of a voltage vector.

Considering a flux linkage vector $\Psi$ which is obtained by a time integration of instaneous voltage vector $\dot{v}$, in order to control the magnitude of $\Psi$ to a substantially constant value, the vector $\dot{v}$ shown in FIG. 2 may be selected. That is, the voltage vector $\dot{v}$ may be selected such that the absolute value $|\Psi|$ of $\Psi$ can be maintained between the lower value $\Psi_{min}$ and upper value $\Psi_{max}$. For example, a case in which $\Psi$ rotates clockwisely in a range of $-\pi/6 < \theta \leq \pi/6$ will be considered, where $\theta$ is an angle between the primary flux linkage vector $\Psi$ and an axis d. If $\Psi$ reaches the upper limit value $\Psi_{max}$ at point $P_1$, $\Psi$ is rotated using $\dot{v}(0,1,0)$ of the eight vectors in order to lower the absolute value. On the contrary, if $\Psi$ reaches the lower limit value $\Psi_{min}$ at point $P_2$, the absolute value is increased by using $\dot{v}(1,1,0)$.

Similarly, in a case where $\theta$ is in a different range, the absolute value of the primary flux linkage vector can be maintained within the predetermined range by detecting that $|\Psi|$ has reached $\Psi_{max}$ or $\Psi_{min}$ and by selecting proper voltage vector $\dot{v}(S_a,S_b,S_c)$ according to the value of $\theta$.

In the case of a motor, for example, the rotating velocity of vector $\Psi$ coincides with the rotating velocity of the rotating magnetic field.

As a vector $\Psi$, any one of the above-mentioned eight vectors may be selected. If the locus of $\Psi$ is made to depict a loop, for example, the harmonic loss and the acoustic noise will be increased. However, by varying the magnitude of vector $\dot{v}$ and the rotating velocity, the torque control and efficiency of an induction motor can be improved.

One optimum vector at any instant within the eight vectors can be selected automatically if the evaluation function and the state function are determined.

Therefore, if the values of vector v as functions of all the input values are stored in the form of tables, the optimum switching pattern (the combination of ON and OFF of the inverter branch) can be quickly and easily qutputted.

Figure 3:
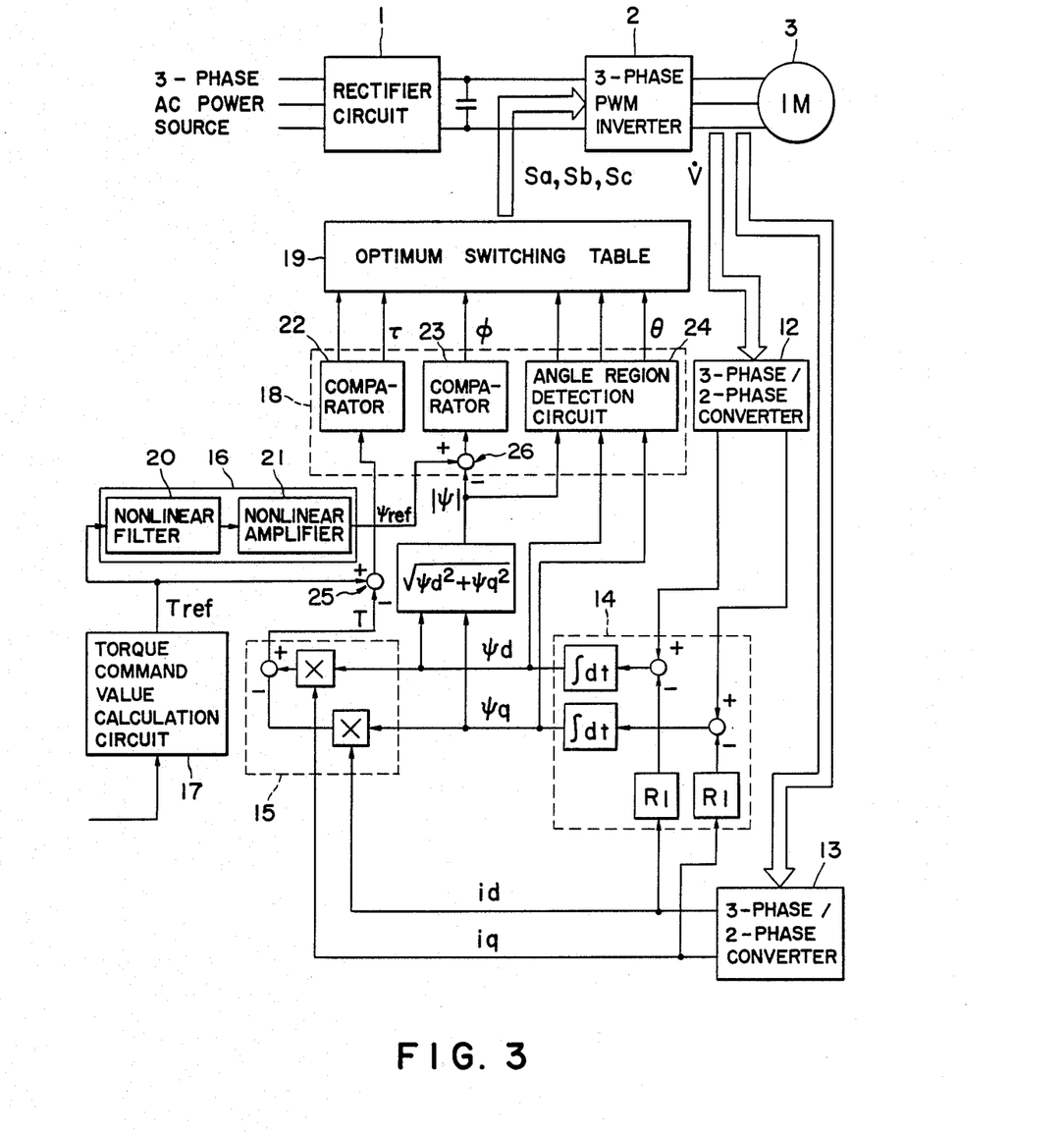
FIG. 3 is a block diagram showing a control system in which the present invention is applied to a high speed torque control and to a high efficiency operation of an induction motor.

FIG. 3 shows an example of a control system to which the present invention is applied for high speed torque control and high efficiency operation.

In FIG. 3, reference numeral 1 denotes a rectifier circuit, 2 a PWM inverter, and 3 an induction motor fed by the inverter. 12 and 13 denote respectively three phase/two phase converters, 14 a primary flux linkage calculation circuit, and 15 an instantaneous torque calculation circuit. The combination of circuits 14 and 15 corresponds to the circuit 4 in FIG. 1.

Figure 3A:
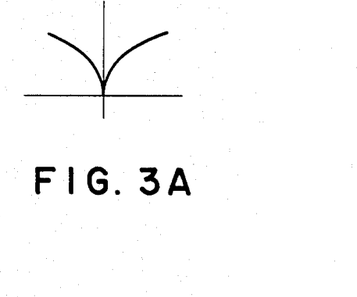
FIG. 3A is a graph showing an input/output characteristic of a nonlinear amplifier 21 in FIG. 3.

Reference numeral 16 denotes a primary flux linkage command calculation circuit which is composed of a nonlinear filter 20 having different time constants for a rise and a fall, and a nonlinear amplifier 21 whose input-/output characteristic is shown in FIG. 3A.

Reference numeral 17 denotes a calculation circuit which calculates a torque command value $T_{ref}$ in accordance with an external command. The circuit 17 is composed of P-I control circuit, etc. The combination of circuits 16 and 17 corresponds to the circuit 5 in FIG. 1.

Reference numeral 18 denotes an address circuit which comprises comparators 22 and 23, and an angle region detection circuit 24.

Figure 3B:
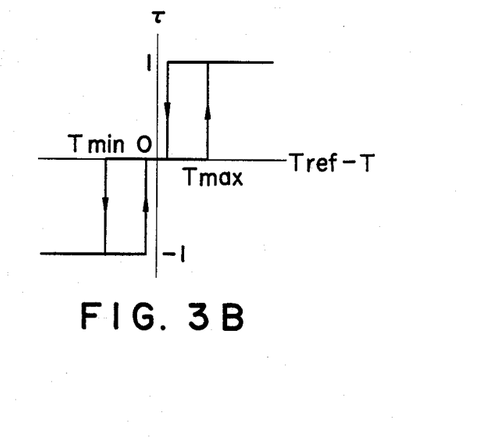
FIG. 3B is a graph showing an input/output hysteresis characteristic of a comparator 22 in FIG. 3.

The comparator 22 is inputted with the difference between the torque command $T_{ref}$ and an instantaneous torque value T, i.e. $T = T_{ref} - T$, which is calculated by a substractor 25 and outputs a 2-bit signal corresponding to one of 1, 0, and $-1$ according to the input signal. The input/output characteristic of the comparator 22 has a hysteresis as shown in FIG. 3B. The output values 1 and $-1$ denote an excess and a shortage of the torque respectively.

Figure 3C:
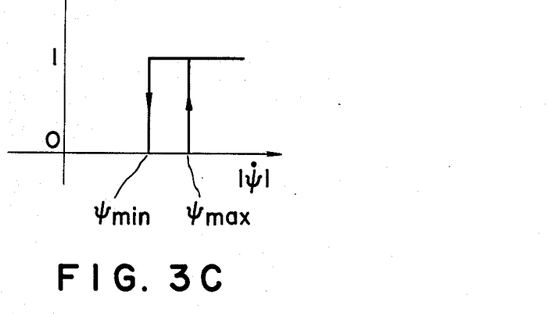
FIG. 3C is a graph showing an input/output hysteresis characteristic of a comparator 23 in FIG. 3.

The comparator 23 is inputted with the difference between the primary flux linkage command $\Psi_{ref}$ and actual primary flux linkage $|\Psi|$ i.e. $\Delta\Psi = \Psi_{ref} - |\Psi|$, which is calculated by a substractor 26, and outputs a 1-bit signal of 1 or 0 according to the input signal. The input/output characteristic of the comparator 23 has hysteresis as shown in FIG. 3C. The $\Psi_{max}$ and $\Psi_{min}$ of the hysteresis curve correspond to the $\Psi_{max}$ and $\Psi_{min}$ in FIG. 2 respectively.

An angle region detector 24 is supplied with signals $\Psi_d$, $\Psi_q$ and $|\Psi|$, for judging the angle of the primary flux linkage vector with reference to axis d line P in one of the 6 regions, each having an angle of 60° so as to output a 3-bit signal which denotes one of 6 regions I–VI. Regions I–VI are the ranges of the angle which satisfy the following equations.

I: $-\pi/6 < \theta \leq \pi/6$
II: $\pi/6 < \theta \leq \pi/2$
III: $\pi/2 < \theta \leq 5\pi/6$
IV: $5\pi/6 < \theta \leq 7\pi/6$
V: $7\pi/6 < \theta \leq 3\pi/2$
VI: $3\pi/2 < \theta \leq 11\pi/6 (= -\pi/6)$ The judgement as to whether the angle $\theta$ is in one of regions I–VI is performed by comparing d axis component of $\Psi_d$ and q axis component of $\Psi_q$ with $\pm\sqrt{3}/2|\Psi|$, $\pm(\frac{1}{2})|\Psi|$ and 0.

The optimum switching table 19 stores optimum switching patterns corresponding to the outputs (which are composed of a combination of output $\tau$ of the comparator 22, output $\phi$ of comparator 23 and output $\theta$ of the angle region detection circuit 24) of the address circuit 18. The optimum switching table 19 is composed of, for example, a read only memory (ROM) which uses the outputs of the address circuit 18 as its addresses, stores the corresponding switching patterns (which are composed of 3-bit data corresponding to states of $S_a$, $S_b$, $S_c$, respectively) in the addresses and outputs corresponding data when an address data is inputted. The switching elements of the inverter are driven according to the output data.

The evaluation function stored in the optimum switching table 19 is programmed so as to improve a transient response rather efficiently and to minimize the harmonic loss and acoustic noise.

Figure 4:
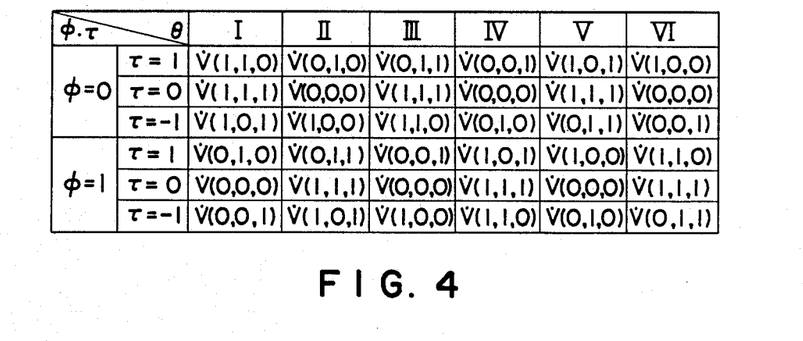
FIG. 4 is a data table stored in an optimum switching table 19 in FIG. 3.

FIG. 4 illustrates an example of the optimum switching table.

In the table, $\tau$ and $\phi$ denote the torque and primary flux linkage output from the comparator, respectively, and $\theta = I, II, III, IV, V, VI$ indicates the angle regions to which the flux vectors $\Psi$ belong.

Figure 5A:
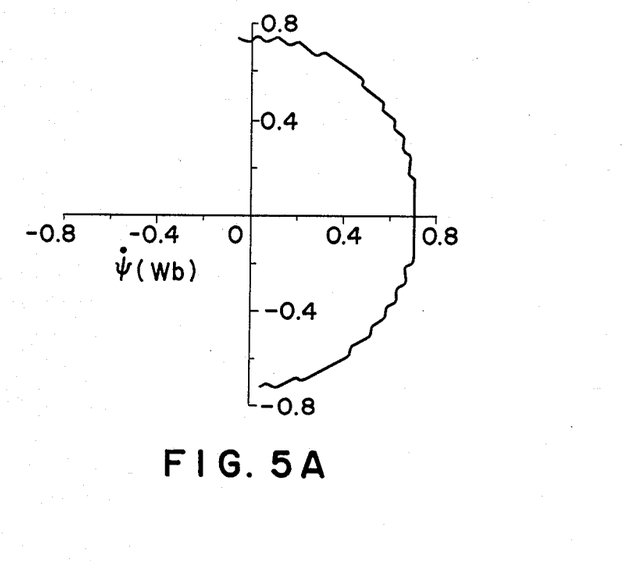
FIG. 5A and 5B are diagrams showing test results by a digital simulation on a transient response of the system shown in FIG. 3 regarding primary flux linkage $\Psi$ and torque T respectively.
Figure 5B:
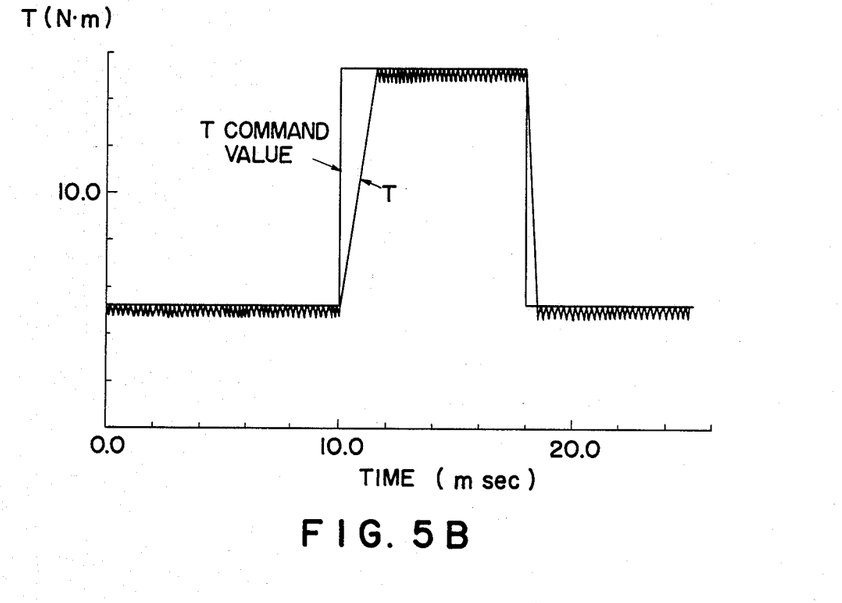

FIGS. 5A and 5B show test results of transient response of primary flux linkage $\dot{\Psi}$ and torque T by digital simulation method. That is, three signals show a locus of primary flux linkage $\dot{\Psi}$ and a variation in torque T when a torque command is changed in a step-wise fashion.

As seen from these figures, the locus of the primary flux linkage $\dot{\Psi}$ forms a minor loop in neither of the stable and transient states. This means that there exist little harmonic loss and little acoustic noise. Moreover, an experiment showed that the harmonic loss is decreased by one half and the acoustic noise is decreased by more than a few decibels.

Moreover, the system has a very simple circuit configuration as well as a very simple adjustment portion for a coefficient $R_1$ (which corresponds to a primary resistance) of a coefficient multiplier in the primary flux linkage calculation circuit 14 when compared with the conventional vector controller.

Further, this system is free from any variation of constants, such as secondary resistance, because the system controls the torque directly.

Because of optimization, the torque response is theoretically quicker than that obtained from the conventional vector control.

Figure 6:
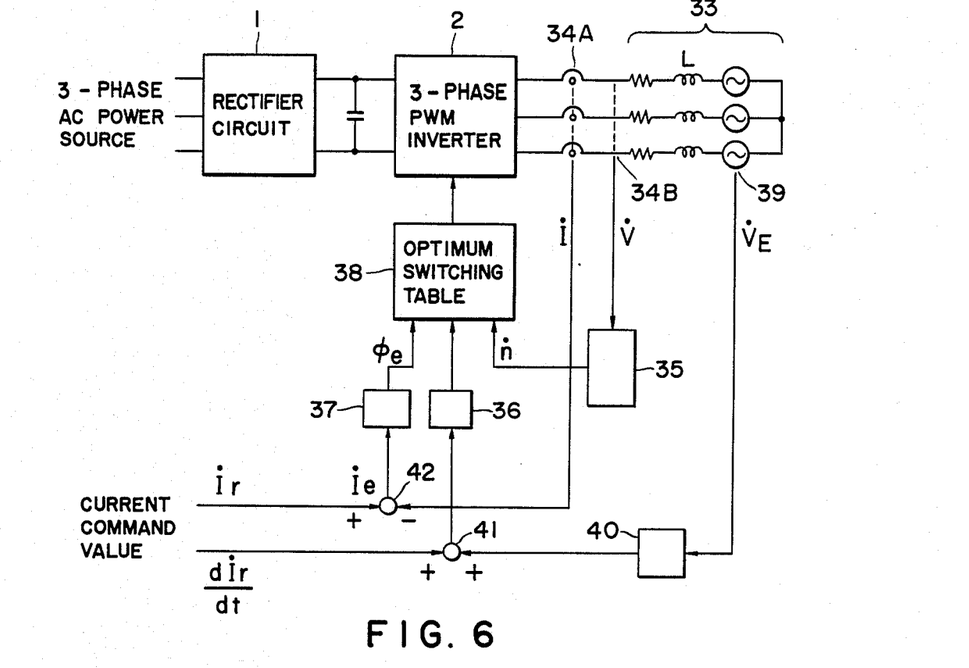
FIG. 6 is a block diagram of a system where the present invention is applied to an optimum current control of an inductive load having a backelectromotive force.

FIG. 6 shows an example of a control system to which an optimum current control of inductive load having a back electromotive force is applied.

In FIG. 6, reference numeral 1 denotes a rectifier circuit, 2 a PWM inverter, 33 an inductive load having a back electromotive force vector $V_E$, 34A a current detector, and 34B a voltage detector, 35 denotes a voltage vector detector circuit for the digital output, 36 an A/D converter, 37 an angle detector circuit for a current error vector of the digital output, and 38 an optimum switching table for determining an optimum voltage vector.

Furthermore reference numeral 39 denotes detection means for detecting back-electromotive force $\dot{v}_E$, 40 a coefficient multiplier which multiplies the back-electromotive force vector $\dot{v}_E$ with a coefficient 1/L (L means an inductance of a load 33), 41 an adder which adds the output of the coefficient multiplier 40, i.e. $\dot{v}_E/L$ to the differentiated current command value $\dot{I}$, i.e. $d\dot{I}_r/dt$, and 42 a substractor which forms a difference Ie between the current command Ir and an actual current I, i.e. $\dot{I}_e = \dot{I}_r - \dot{I}$.

The control method executed in the system shown in FIG. 6 is an example of an instantaneous current control method in which an evaluation function is made minimum.

The equation described below is used as an evaluation function I.

$$I = n^2 e^2 / T^2$$

where, n means a number of change-over switchings when a next voltage vector is selected by changing the switches of an inverter, $e^2$ a mean square error within a control interval, and T a time interval within a control interval, which determines good or bad when the switching frequency is relatively high. This value is calculated according to the following equation.

$$I = \frac{n^2}{4} \left| \left( \frac{dI_e}{dt} \right)_{t=0} \right|^2 \left\{ \frac{1}{\cos^2 \phi} - 1 \right\}$$

where, $\dot{I}_e$ is $\dot{I}_r - \dot{I}$ as shown in FIG. 6, and $\phi$ is an angle between $\dot{I}_e$ and $(d\dot{I}_e/dt)t=0$ immediately after the switching.

If the back-electromotive force vector and the inductance are assumed to be $v_E$ and L respectively, their relation is approximately expressed by $$\frac{d\dot{I}}{dt} = (\dot{v} - \dot{v}_E)/L$$

Therefore it is sufficient to select a voltage vector $\dot{v}$ which can minimize the evaluation function v from all the voltage vectors determined by an inverter (8 for 3-phase bridge type inverter).

This selection can be performed using, for example, an instantaneous sampling value or sampling values for a predetermined time interval when $\dot{I}_e$ is larger than the predetermined value.

In order to determine the voltage vector $\dot{v}$ which minimizes I, it is necessary to input angle $\phi_e$ of the vector $\dot{I}_e$, $d\dot{I}_r/dt + \dot{v}_E/L$ and the present state of voltage vector v.

Figure 7:
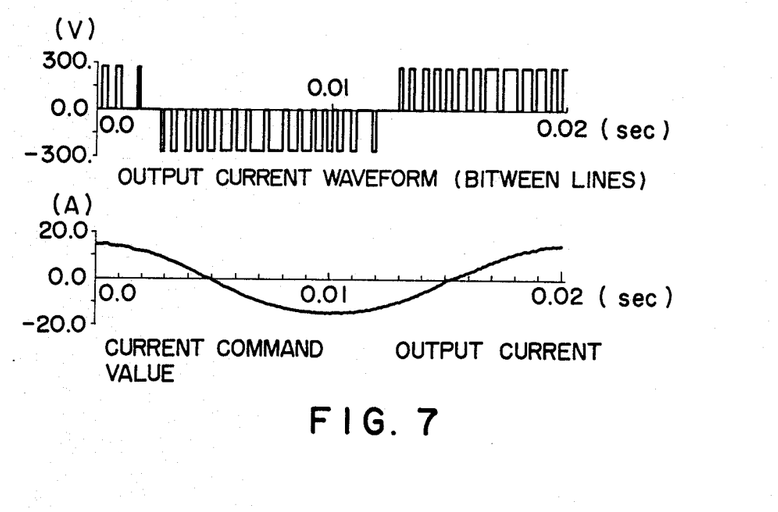
FIG. 7 is a graph showing an output voltage waveform, a current command and an output current waveform.

FIG. 7 shows an output voltage waveform, current command values and an output current waveform.

These waveforms were obtained when the circuit constants are L=10 mH, R=0.1Ω and $V_E$=140 V and a d.c. input voltage into the inverter is 270 V.

According to the present invention, the evaluation function has become one half of that obtained at the same switching frequency by the conventional method. This means that the harmonic loss is decreased to one half and the acoustic noise of a load is extremely reduced.

Thus, the optimum control of the system is accomplished by determining the evaluation function.

In the embodiments shown in FIGS. 6 and 7, no optimum switching table is indicated. However, the optimum switching patterns under any conditions could be made easily by one skilled in the art if the evaluation function is determined.

In the above-mentioned embodiment, the optimum switching table is provided and switching patterns corresponding to respective input conditions are read out from the table, but the present invention is not limited to that embodiment. Switching patterns may be obtained by giving respective input conditions to a micro computer producing switching patterns as a result of calculations.

As described above, according to the present invention, a switching for the optimization of an evaluation function which is composed of functions of state variables is made possible, and multi-variable control is easily performed because the errors caused by a commanded value are minimized simultaneously.

Moreover, the present invention can contribute to an improvement of the system stability in motor control because a switching pattern which decreases harmonic loss and acoustic noises accompanying a switching of the PWM inverter can be selected, and the pattern can be selected to avoid voltage pulses having extremely narrow pulse widths.

Further, from the viewpoint of hardware, no complex calculation is needed, digitalization is very easy and high speed operation is possible because the optimum switching pattern is obtained only by reading out memories directly.

The present invention is suitable for use in PWM inverters connected to various AC loads or AC power supplies.

I claim:

1. A control method for a PWM inverter having branches containing switching means, said method comprising the steps of:
   obtaining first digital signals of two or more state variables which represent whole combination states of said PWM inverter and load systems connected to an AC side of said PWM inverter and second digital signals of two or more deviations of said state variables from corresponding command values;
   defining an evaluation function having as variables said state variables and said deviations;
   inputting a set of said first and second digital signals to a memory as addresses; and,
   deriving data from said memory for switching said switching means of the branches of said inverter so that a value of the evaluation function is minimized.

2. A control apparatus for a PWM inverter having branches containing switching means and an AC side to which a load system is connected comprising:
   first means for generating two or more state variables representative of a combination state of the PWM inverter and the load systems;
   second means for generating two or more command values corresponding to the state variables;
   third means for generating two or more deviations of said state variables from said corresponding command values;
   fourth means for generating address data based on the state variables and deviations;
   memory means for storing data on adaptive states of said switching means of said branches of the inverter and for outputting said data in response to said address data; and
   switching control means for controlling the switching means of the branches of the inverter so that the value of an evaluation function having as variables said state variables and said deviations is minimized.

3. A control apparatus according to claim 2, wherein said load system is an induction motor, said first means generates torque data and primary flux linkage data, said second means generates command data of the torque and primary flux linkage, said third means generates deviations as to torque and primary flux linkage, and the apparatus further comprising means for detecting whether a rotational angle of said primary flux linkage belongs to one of a predetermined number of angle regions for producing a digital signal indication of the result of detection.

4. An apparatus according to claim 3, wherein said third means for generating torque deviation data comprises a comparator which has hysteresis characteristics and is inputted with the torque deviation and outputs a signal representing one of 1, 0, or −1 according to said deviation.

5. An apparatus according to claim 3, wherein said third means for generating primary flux linkage deviation data comprises a comparator which has hysteresis characteristics and is inputted with a primary flux linkage deviation and outputs a signal representing either 1 or 0 according to said deviation.

6. An apparatus according to claim 2, wherein said first means comprises a current detector and a back-electromotive force detector, said third means comprises a first subtractor which subtracts output of said current detector from current command value and a second subtractor which subtracts output of said back-electromotive force detector from a differentiated current command value, and said fourth means comprises an angle detector circuit for a current error vector of said first subtractor and an A/D converter which converts the output of the second subtractor.

* * * * *

UNITED STATES PATENT AND TRADEMARK OFFICE
CERTIFICATE OF CORRECTION

PATENT NO. : 4,800,478

DATED : January 24, 1989

INVENTOR(S) : Isao TAKAHASI

It is certified that error appears in the above-identified patent and that said Letters Patent is hereby corrected as shown below:

On the face of the patent, Item No. [73] should read --Kabushiki Kaisha Toshiba, Kawasaki, Japan, part interest--.

In Figure 2, "g" should read --q--.

In Figure 3, "$|\Psi|$" should read -- $|\dot{\Psi}|$ --.

Column 2, line 19, $\hat{x}1, \hat{x}2, \ldots,$" should read --$x1, x2, \ldots,$--, Column 2, line 21, "$x1, x2, x3, \ldots$ which correspond to $\hat{x}1, \hat{x}2, \hat{x}3, \ldots$" should read --$\hat{x}1, \hat{x}2, \hat{x}3, \ldots$ which correspond to $x1, x2, x3, \ldots$--, Column 2, line 34, "$\dot{S}_a$" should read --$S_a$--, Column 2, line 35, "$v(S_a,$" should read --$\dot{v}(S_a,$--, Column 2, line 43, "$|\Psi|$" should read -- $\dot{\Psi}$ --, Column 2, line 48, "$|\Psi|$ of $\Psi$" should read --$|\dot{\Psi}|$ of $\dot{\Psi}$ --, Column 2, line 61, "$1/8_{min}$" should read -- $\Psi_{min}$--.

Column 3, line 9, "v" should read --$\dot{v}$--,

Column 3, line 57, " $|\Psi|$ " should read -- $|\dot{\Psi}|$ --,

Column 3, line 58, "P" should read --is--.

Column 4, line 28, " $\Psi$ " should read -- $\dot{\Psi}$ --.

Column 5, line 5, "substractor" should read --subtractor--,

Column 5, line 49, "state" should read --state $\dot{n}$--,

UNITED STATES PATENT AND TRADEMARK OFFICE
CERTIFICATE OF CORRECTION

PATENT NO. : 4,800,478

DATED : January 24, 1989

INVENTOR(S) : Isao TAKAHASI

It is certified that error appears in the above-identified patent and that said Letters Patent is hereby corrected as shown below:

Column 5, line 50, "v" should read --$\dot{v}$--.

Signed and Sealed this

Tenth Day of July, 1990

Attest:

HARRY F. MANBECK, JR.

*Attesting Officer*   *Commissioner of Patents and Trademarks*